(12) United States Patent  (10) Patent No.: US 8,887,080 B2
Hayman  (45) Date of Patent: Nov. 11, 2014

(54) INDICATING STATUS OF APPLICATION PROGRAM WITH ICONS

(75) Inventor: Scott Jackson Hayman, Oakville (CA)

(73) Assignee: BlackBerry Limited, Waterloo (CA)

( * ) Notice: Subject to any disclaimer, the term of this patent is extended or adjusted under 35 U.S.C. 154(b) by 1032 days.

(21) Appl. No.: 12/086,766

(22) PCT Filed: Dec. 19, 2006

(86) PCT No.: PCT/CA2006/002059
§ 371 (c)(1),
(2), (4) Date: Dec. 22, 2008

(87) PCT Pub. No.: WO2007/071027
PCT Pub. Date: Jun. 28, 2007

(65) Prior Publication Data
US 2009/0150820 A1   Jun. 11, 2009

(30) Foreign Application Priority Data
Dec. 19, 2005   (EP) .................................... 05112434

(51) Int. Cl.
*G06F 3/048*   (2013.01)
*G06F 3/0481*   (2013.01)
*G06F 9/44*   (2006.01)
*G06Q 10/10*   (2012.01)

(52) U.S. Cl.
CPC .......... *G06F 3/04817* (2013.01); *G06F 3/0481* (2013.01); *G06Q 10/107* (2013.01); *G06F 9/4443* (2013.01)
USPC ........... 715/772; 715/751; 715/752; 715/836; 715/764

(58) Field of Classification Search
CPC .................................................. G06Q 10/107
USPC .......................... 715/751, 752, 836, 764, 772
See application file for complete search history.

(56) References Cited

U.S. PATENT DOCUMENTS

| 5,617,526 | A |  | 4/1997 | Oran et al. |
| 5,666,500 | A |  | 9/1997 | Robertson |
| 6,014,135 | A | * | 1/2000 | Fernandes ..................... 715/744 |

(Continued)

FOREIGN PATENT DOCUMENTS

| EP | 0398648 A2 | 11/1990 |
| EP | 0540925 A1 | 5/1993 |

(Continued)

OTHER PUBLICATIONS

IBM Technical Disclosure Bulletin, "Dynamic Graphical Icon Exchange", vol. 32 No. 64 p. 252, Nov. 1989 [XP43194].

(Continued)

*Primary Examiner* — William Titcomb
(74) *Attorney, Agent, or Firm* — Steven M. Greenberg, Esq.; CRGO Law

(57) ABSTRACT

A computing device (100) and computing environment displays a graphical user interface (110) that presents a plurality of icons (260). Each icon is related to a different aspect of a resident software application. The icons are used to indicate the status of their associated aspects of the software application. Changes of state of the aspects of the software application represented by the displayed icons are determined and used to update the displayed icons so that the displayed icons present current status information concerning the associated aspects of the software application.

4 Claims, 4 Drawing Sheets

(56) References Cited

U.S. PATENT DOCUMENTS

| | | | |
|---|---|---|---|
| 6,192,118 B1* | 2/2001 | Bayless et al. | 379/201.01 |
| 6,337,699 B1 | 1/2002 | Nielson | |
| 6,411,685 B1* | 6/2002 | O'Neal | 379/88.14 |
| 6,546,417 B1* | 4/2003 | Baker | 709/206 |
| 6,661,438 B1 | 12/2003 | Shiraishi et al. | 715/835 |
| 6,691,111 B2* | 2/2004 | Lazaridis et al. | 1/1 |
| 6,917,373 B2 | 7/2005 | Vong et al. | |
| 7,107,544 B1* | 9/2006 | Luke | 715/752 |
| 7,212,399 B2* | 5/2007 | Kee et al. | 361/679.09 |
| 7,271,997 B2* | 9/2007 | Kee et al. | 361/679.27 |
| 7,434,177 B1* | 10/2008 | Ording et al. | 715/862 |
| 7,472,187 B2* | 12/2008 | Malik | 709/224 |
| 7,516,410 B2* | 4/2009 | Thompson et al. | 715/753 |
| 7,519,912 B2* | 4/2009 | Moody et al. | 715/753 |
| 7,530,052 B2* | 5/2009 | Morrow et al. | 717/113 |
| 7,536,440 B2* | 5/2009 | Budd et al. | 709/206 |
| 7,631,045 B2* | 12/2009 | Boerries et al. | 709/206 |
| 7,796,141 B2* | 9/2010 | Sheridan | 345/660 |
| 7,908,562 B2* | 3/2011 | McKee et al. | 715/764 |
| 7,921,368 B2* | 4/2011 | Moody et al. | 715/751 |
| 2002/0002453 A1* | 1/2002 | Lazaridis et al. | 704/9 |
| 2002/0070978 A1 | 6/2002 | Wishoff et al. | |
| 2002/0075304 A1* | 6/2002 | Thompson et al. | 345/751 |
| 2003/0119562 A1* | 6/2003 | Kokubo | 455/566 |
| 2004/0119758 A1 | 6/2004 | Grossman et al. | |
| 2004/0122907 A1 | 6/2004 | Chou et al. | |
| 2004/0172455 A1* | 9/2004 | Green et al. | 709/207 |
| 2004/0216058 A1 | 10/2004 | Chavers et al. | |
| 2004/0222978 A1* | 11/2004 | Bear et al. | 345/184 |
| 2005/0064911 A1* | 3/2005 | Chen et al. | 455/566 |
| 2005/0073515 A1* | 4/2005 | Kee et al. | 345/204 |
| 2005/0076087 A1* | 4/2005 | Budd et al. | 709/206 |
| 2005/0076338 A1* | 4/2005 | Malik | 718/100 |
| 2005/0117130 A1* | 6/2005 | Bohn et al. | 353/119 |
| 2005/0120306 A1* | 6/2005 | Klassen et al. | 715/765 |
| 2005/0166154 A1* | 7/2005 | Wilson et al. | 715/751 |
| 2005/0188312 A1* | 8/2005 | Bocking et al. | 715/739 |
| 2005/0188320 A1* | 8/2005 | Bocking | 715/752 |
| 2005/0198584 A1* | 9/2005 | Matthews et al. | 715/779 |
| 2005/0237702 A1* | 10/2005 | Kee et al. | 361/681 |
| 2005/0264986 A1* | 12/2005 | Kee et al. | 361/681 |
| 2006/0179415 A1 | 8/2006 | Cadiz | |
| 2006/0190833 A1 | 8/2006 | SanGiovanni et al. | 715/767 |
| 2006/0195379 A1* | 8/2006 | Abecassis et al. | 705/35 |
| 2006/0284892 A1* | 12/2006 | Sheridan | 345/661 |
| 2007/0083827 A1* | 4/2007 | Scott et al. | 715/811 |
| 2007/0130338 A1* | 6/2007 | Malik et al. | 709/225 |
| 2007/0189737 A1* | 8/2007 | Chaudhri et al. | 386/125 |
| 2007/0204218 A1* | 8/2007 | Weber et al. | 715/530 |
| 2007/0239869 A1* | 10/2007 | Raghav et al. | 709/224 |
| 2007/0271527 A1* | 11/2007 | Paas et al. | 715/810 |
| 2008/0148154 A1* | 6/2008 | Burrell et al. | 715/733 |
| 2009/0247931 A1* | 10/2009 | Damgaard-Sorensen | 604/19 |

FOREIGN PATENT DOCUMENTS

| | | |
|---|---|---|
| WO | WO 96/30846 A1 | 10/1996 |
| WO | WO 2004/104789 A2 | 12/2004 |
| WO | WO 2005/055034 A1 | 6/2005 |
| WO | WO 2005/060392 A2 | 7/2005 |

OTHER PUBLICATIONS

IBM Technical Disclosure Bulletin, "Architecture for Conveying Important Information Using Animation", vol. 37 No. 7, p. 657-658, Jul. 1994 [XP000455656].

IBM Technical Disclosure Bulletin, "Multi-State Icon", vol. 35 No. 1A p. 338-339, Jun. 1992 [XP000308888].

International Search Report Mailed Mar. 29, 2007 by ISA/CA for PCT/CA2006/002059.

European Search Report for EP05112434.

2007/0143710; Publication Date Jun. 21, 2007; Hayman, Scott; Office Action of Nov. 21, 2007 received in U.S. Appl. No. 11/305,219.

Benjamin Mouton, European Search Report issued Aug. 25, 2010 in relation to European Patent Application No. 10161701.7, 6 pages.

IBM: "Excerpt: Lotus Notes, Domino, Domino 1.9 Designer (Doc. No. G210-1996-00; Version 6.5.4)" [http://www-12.lotus.com/ldd/doc/uafiles.nsf/docs/RN654/$File/readme654.pdf] 27 pages. retrieved Dec. 2, 2010.

Office Action issued in respect of U.S. Appl. No. 12/153,593.

The University of Manchester, "ICON.Outlook User Guide", Apr. 2005, Training and Information Services, IT Services Division, University of Manchester (99 pages).

* cited by examiner

INDICATING STATUS OF APPLICATION PROGRAM WITH ICONS

CROSS REFERENCE TO RELATED APPLICATION

This application claims the benefit under 35 U.S.C. 119 of European Patent Application Serial No. 05112434.5 filed on Dec. 19, 2005.

FIELD

This disclosure relates to a computing device and computing environment wherein a graphical user interface is displayed that presents multiple icons, each icon relating to a different aspect of a resident software application.

BACKGROUND

In many computing environments, it is common to display a graphical user interface or desktop that presents icons relating to resident software applications. In some instances, the displayed icons represent resident software applications that are launched and running on the computing device while in other instances, the displayed icons represent resident software applications that are dormant. In the later case, by selecting a displayed icon associated with a dormant software application, the related software application can executed or "launched". Once launched, depending on the configuration of the software application, either an application graphical user interface is displayed, allowing the user to interact with the launched software application, or an icon is displayed to identify visually to the user that the software application is running. In the former case, the application graphical user interface can often be minimized to reduce it to an icon on the desktop.

Unfortunately, displayed icons are typically static, and although a user can interact with such displayed icons to launch or interact with software applications, the displayed icons themselves provide little if any information concerning the status of the software applications. In many instances, having more information concerning the status of launched software applications readily available is desired.

Although some software applications, such as Microsoft Outlook® display folder icons that provide some information concerning the status of the software application, the status information is limited. As will be appreciated, there is a desire for graphical user interfaces or desktops that provide more status information concerning resident software applications that are running on computer devices.

SUMMARY

Accordingly, in one aspect there is provided in a computing environment where a graphical user interface is displayed that presents multiple icons, each icon relating to a different aspect of the same resident software application, a method of indicating the status of said software application comprising:

determining when a change in the status of an aspect of said software application represented by a displayed icon occurs; and updating the displayed icon so that said displayed icon presents current status information concerning the associated aspect of said software application.

In one embodiment, the determining is performed synchronously by polling the software application to detect changes in status of the different aspects of the software application. In another embodiment, the determining is performed asynchronously in response to change notices generated by the software application when changes in the status of the different aspects thereof occur.

The graphical user interface may present a plurality of icons associated with at least one view of the software application. The software application may be a messaging application with each icon representing a different message folder of a view thereof and presenting the message-bearing state of the folder. Alternatively the software application may be an instant messaging application with each icon representing a different contact and presenting the status of the contact.

According to another aspect, there is provided a computing device comprising:

an operating system executable on hardware; and at least one resident software application running on a platform provided by said operating system, said at least one resident software application being represented by multiple icons displayed on a graphical user interface, wherein said displayed icons include status icons, each status icon relating to a different aspect of said software application and presenting current status information concerning that aspect of said software application, said operating system determining when a change in the status of an aspect of said software application represented by a displayed status icon occurs and updating said status icon accordingly.

BRIEF DESCRIPTION OF THE DRAWINGS

Embodiments will now be described, by way of example only, with reference to the accompanying drawings in which.

DESCRIPTION OF THE EMBODIMENTS

Figure 1:
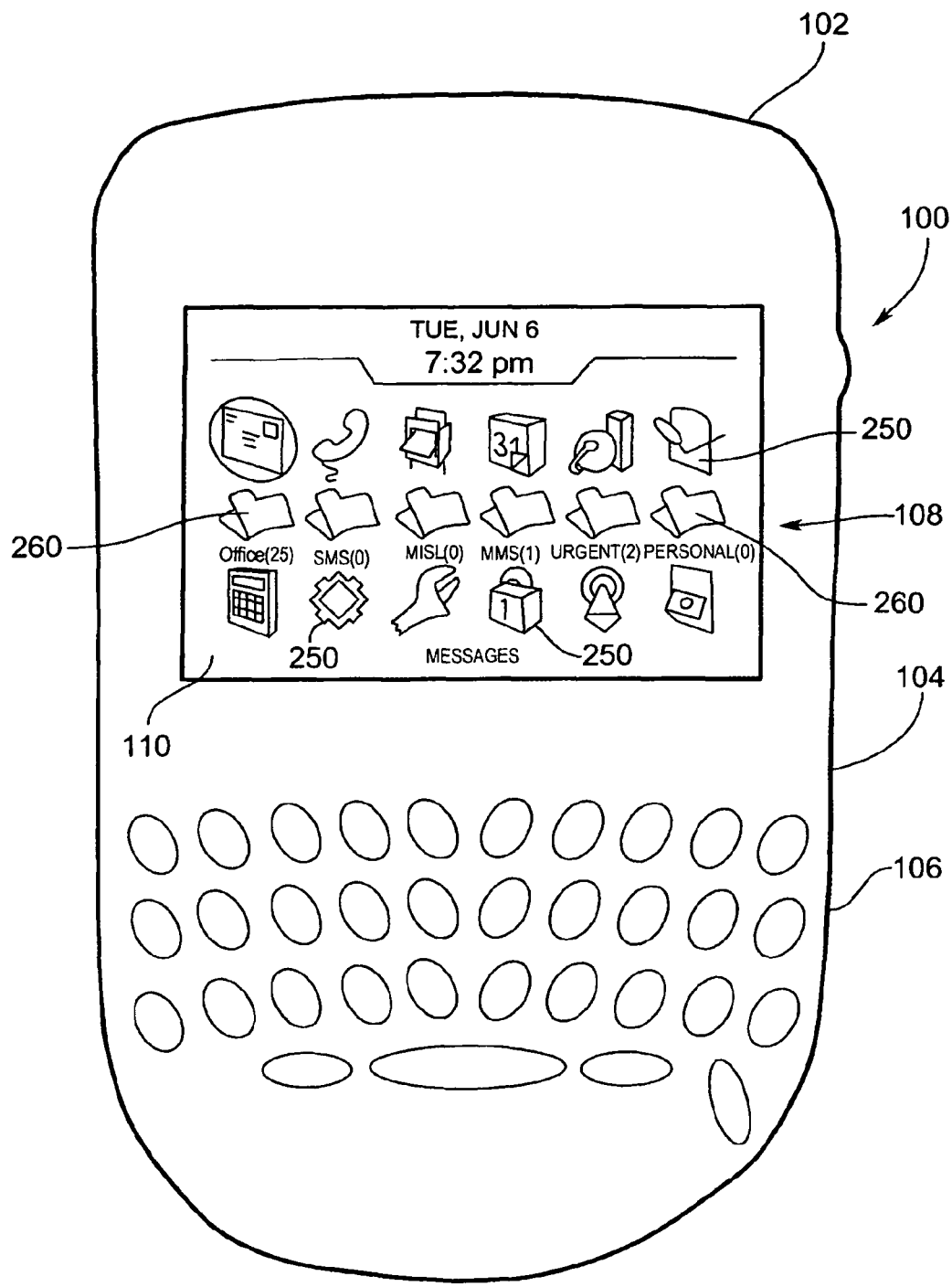
FIG. 1 is a front plan view of a portable wireless communications device including a display on which icons are presented.
Figure 2:
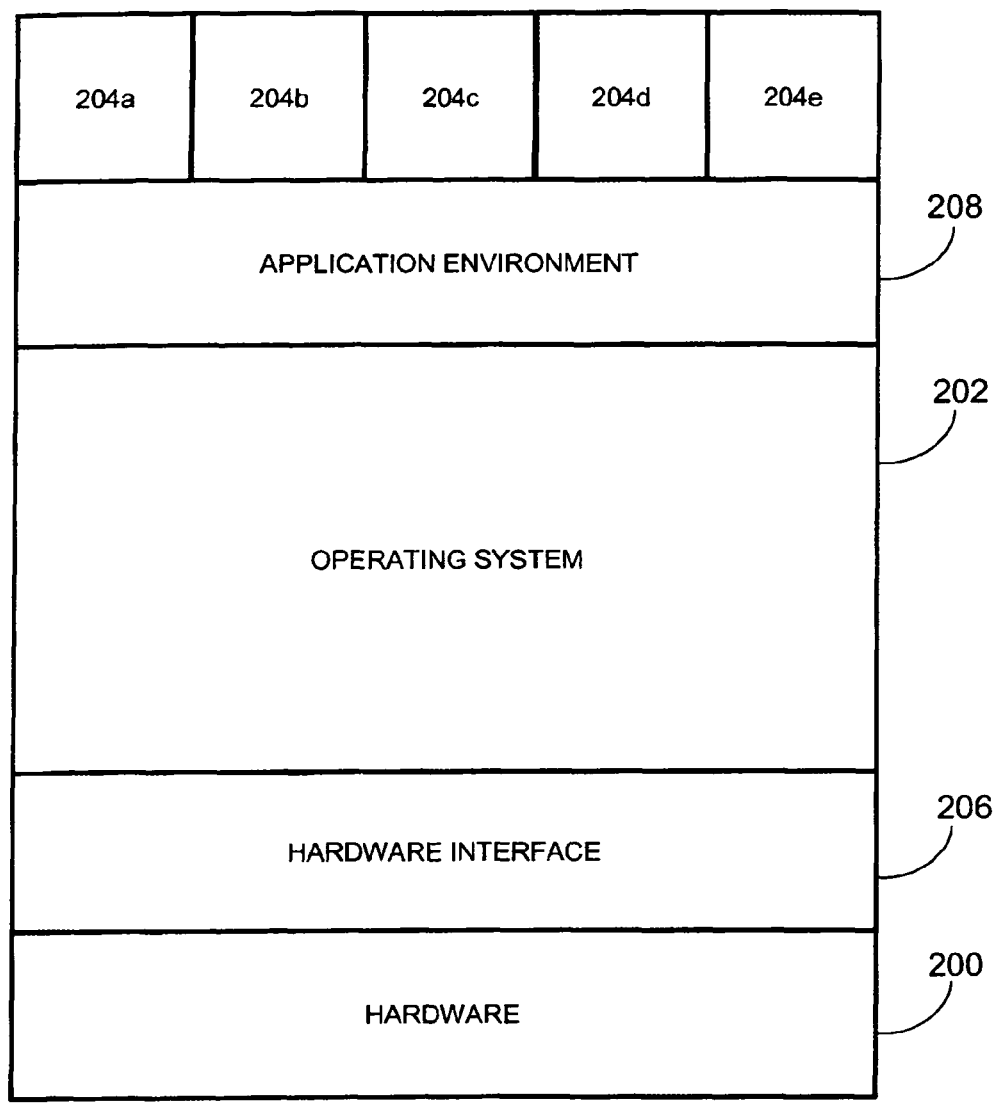
FIG. 2 is an abstract layer diagram showing hardware and software components of the communications device of FIG. 1.

Turning now to FIGS. 1 and 2, a portable wireless communications device is shown and is generally identified by reference numeral 100. As can be seen, communications device 100 includes a housing 102 having a front panel 104 on which a keypad 106 and display 108 are disposed. A graphical user interface (GUI) 110 is presented on the display 108.

Within the communications device housing 102 is the communications device hardware 200 on which an operating system (OS) 202 and a plurality of resident software applications 204a to 204e reside. The operating system 202 communicates with a hardware interface 206 and an application environment 208. In this manner, the OS 202 is able to control operation of the hardware 200 via the hardware interface 206 and provide a suitable operating platform for the software applications 204 via the application environment 208.

The GUI 110 presented on the display 108 corresponds to the application environment 208 and includes icons relating to various resident software applications. In some instances, the icons represent resident software applications that are running on the communications device 100 while in other instances the icons represent resident software applications that are dormant but which can be selected to launch and run the associated software applications. In the later case, when a software application is launched through selection of its corresponding icon, an application GUI of the launched software application may be presented on the display 108 overlying the GUI 110. The application GUI, depending on its configuration, may occupy all or part of the display 108.

Depending on the nature of the software application, the software application may be represented on the GUI 110 by a single icon or by a plurality of icons. Also, the icons may be of the conventional static type or may be status icons as will now be described.

For example, as shown in FIG. 1, the GUI 110 presents three rows of icons. Each icon 250 in the top row and the bottom row is of the conventional static type and relates to a different software application that may be dormant or running on the communications device 100. The icons 260 in the second row relate to different aspects of the same software application program, in this case a messaging application and are of the status type.

In particular, in this example, each of the status icons 260 represents a different message folder within a message view inbox. Those of skill in the art will appreciate however that message folders within other message views such as, for example, a sent box, outbox or draft box may also be displayed either in conjunction with or instead of the inbox message folders. Unlike conventional static icons, the status icons 260 not only represent the different message folders of the inbox but also provide status information concerning the content of the message folders. In this example, the status information displays the quantitative message-bearing state of each message folder. The quantitative message-bearing state may identify, for example, unread messages, flagged messages, read messages etc. The status information relating to the message folders is updated regularly to provide the user with up-to-date feedback concerning the quantity of various message types accessible via the message folders. The status information relating to the message folders may be updated synchronously or asynchronously. The type of software application and the nature of the status information being displayed determines how the status information is updated. For critical status information, asynchronous updating is typically used.

In the case of software applications that are represented by status icons 260, the set of status icons 260 may be fixed by the software application. Alternatively, the software application may provide the user with the facility to select from fixed sets of status icons 260 or select individual status icons. For example, the set of status icons may be fixed to be those that represent the folders of the message view inbox, outbox and draft box etc. Alternatively, the user may be able to select the message view or views whose folders are to be displayed. Still alternatively, the user may be able to select individual folders from the various message views.

Figure 3:
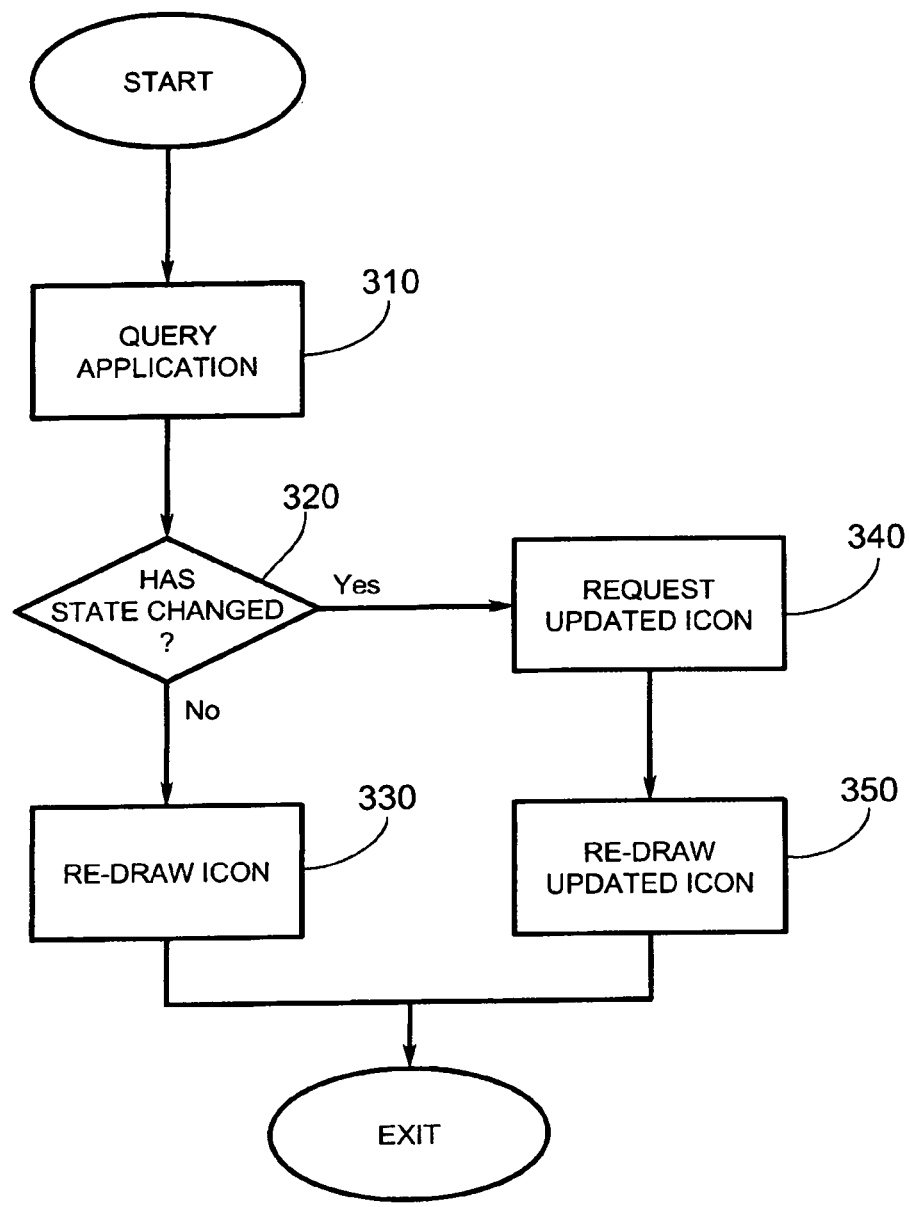
FIG. 3 is a flowchart showing the steps performed during synchronous updating of displayed status icons.

Turning now to FIG. 3, the steps performed during synchronous updating of the status icons are shown. As can be seen, when the GUI 110 is displaying status icons 260, the application environment 208 queries the software application(s) associated with the status icons (step 310) to determine if there is a change in the status of the software application(s) and hence the status information provided by the displayed status icons (step 320). For each status icon 260 where there has been no change in its status information, the status icon is simply either redrawn or left in its existing form (step 330). For each status icon 260 where there has been a change in the message-bearing state of its associated message folder, the application environment 208 requests updated icon information from the software application reflecting the current message-bearing state (step 340) and uses the updated icon information to draw the updated status icon (step 350). The synchronous updating of the status icons 260 is performed at an interval deemed appropriate for the nature of the status information being presented thereby to provide up-to-date status information.

Figure 4:
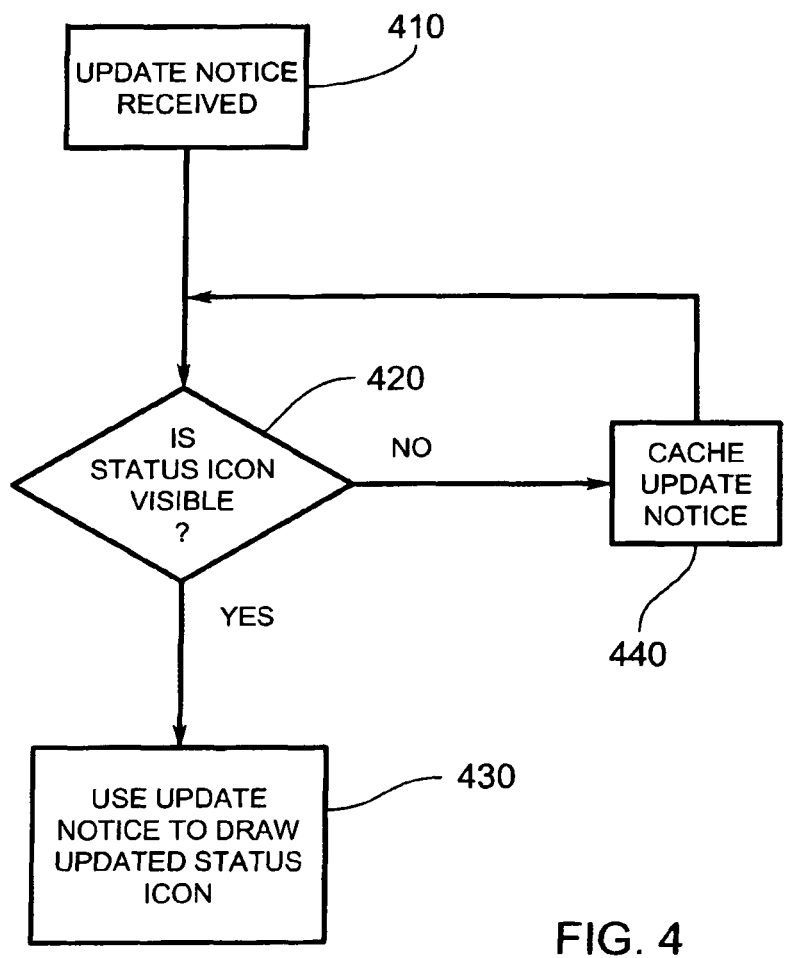
FIG. 4 is a flowchart showing the steps performed during asynchronous updating of displayed status icons.

Turning now to FIG. 4, the steps performed during asynchronous updating of the status icons 260 are shown. As can be seen, when the GUI 110 is displaying status icons, the application environment 208 monitors the software application(s) associated with the status icons 260 to await receipt of update notices generated by the software application(s) signifying a change in the message-bearing states of their associated message folders. The update notices include updated icon information to allow status icons 260 to be redrawn with current status information. Upon receipt of an update notice (step 410), the application environment 208 examines the status icon associated with the update notice to determine if the status icon is visible (step 420). If the status icon 260 is visible, the update notice is used to draw the updated status icon 260 thereby to provide up-to-date status information (step 430). At step 420, if the status icon is not visible, the update notice is cached (step 440). After an appropriate delay, the process reverts back to step 420 to determine if the status icon 260 is visible. Thus, in the event of a cached update notice, the status icon associated with the cached update notice is checked at intervals to determine if the status icon has become visible. When the status icon 260 becomes visible, the status icon is redrawn using the cached update notice (step 430). The above process is initiated whenever an update notice is received.

As will be appreciated, when the status icons are synchronously updated, displayed status icons 260 are updated at regular intervals chosen to ensure that the status information presented by the status icons remains current. When the status icons are asynchronously updated, the status icons 260 are updated whenever a status change of the related software application(s) occurs. By providing status icons, status information concerning the related software applications is visually presented to the user.

Although the status icons are shown and described as representing message folders associated with different views of a messaging application, those of skill in the art will appreciate that this is for illustrative purposes only. Status icons can be used to represent different aspects of virtually any software application. For example, the status icons may be used to represent different contacts in an instant messaging (IM) application and to present the status of these IM contacts, i.e. online, busy, away etc. Alternatively, the status icons may be used to represent different states of various game sessions of a gaming application.

The use of status icons is also not limited to portable wireless communication devices. The status icons can be used in basically any computing environment where icons are used to represent resident software applications and where additional status information concerning launched resident software applications is desired.

The above-described embodiments are intended to be examples only and alterations and modifications may be effected thereto, by those of skill in the art, without departing from the scope of the exclusive right which is defined solely by the claims appended hereto.

What is claimed is:

1. A handheld wireless communications device, comprising:
a housing;
a processor, memory and a display disposed in the housing;
a user input device;

an operating system executing in the memory of the device and providing access to functionality of the device, the operating system hosting the operation of a plurality of different computer programs;

a graphical user interface (GUI) for the operating system displayed in the display, the GUI comprising a first set of icons, each icon of the first set configured upon activation to launch execution in the operating system of a corresponding one of the computer programs; and, a second set of icons displayed in the GUI of the operating system, the icons of the second set including a personal email icon and an office email icon, each of the icons in the second set further being associated with a numeric indication displayed in the GUI and corresponding to a number of respectively unread email messages.

2. The device of claim 1, wherein the numeric indication is a number of urgent, unread email messages.

3. The device of claim 1, wherein the numeric indication is a number of flagged, unread email messages.

4. The device of claim 1, wherein one of the computer programs is a text messaging application, the device further comprising an additional icon displayed in the GUI of the operating system and corresponding to a numeric indication of a number of text messages of the text messaging application.

* * * * *